3,048,571
POLYMERIZATION OF ETHYLENICALLY UN-
SATURATED COMPOUNDS USING MONOVA-
LENT MAGNESIUM HALIDE CATALYSTS
Rudolf Stroh and Karl Nützel, Leverkusen, Germany, assignors to Farbenfabriken Bayer Aktiengesellschaft, Leverkusen, Germany, a corporation of Germany
No Drawing. Filed Feb. 10, 1959, Ser. No. 792,268
Claims priority, application Germany Feb. 14, 1958
18 Claims. (Cl. 260—88.7)

The present invention relates to the polymerization of polymerizable unsaturated compounds; and more especially to the polymerization of ethylenically unsaturated compounds.

It has been found that unsaturated compounds can be polymerized if monovalent magnesium compounds are used as polymerization catalysts. Monovalent magnesium compounds are described in Chemical Review 57, page 417 (1957), and can be prepared by electrolytic reduction. Furthermore, they are formed on the surface of magnesium metal in a mixture of magnesium metal and divalent magnesium compounds and etherates thereof, a mixture of $MgI_2$ and $Mg$ being particularly suitable. Moreover, monovalent magnesium compounds are obtained by the process disclosed in Berichte 85 (1952), page 593, according to which an arylmagnesiumhalide is subjected to pyrolysis at elevated temperature under reduced pressure.

The term ethylenically unsaturated compounds as used herein means olefines, such as ethylene, propylene, butylene or isobutylene, and also higher monoolefines as well as cyclohexene, vinylcyclohexene, styrene, α-methylstyrene, styrenes which are alkylated in the benzene nucleus, divinylbenzene, acrylonitrile and others. Olefines containing halogens, such as dichloroethene and vinyl chloride are to be considered, and also conjugated diolefines, such as butadiene, isoprene, dimethyl butadiene, chloroprene and others. These said polymerizable monomers can also be used in mixtures.

Polymerization is preferably carried out under substantially anhydrous conditions in inert liquid organic solvents, such as aliphatic, cycloaliphatic and aromatic hydrocarbons, as for example hexane, heptane, isooctane, cyclohexane, benzene, toluene, xylene, or mixtures of such hydrocarbons. The polymerization can be effected within wide temperature limits and sometimes even at room temperature. Temperatures within the range of about 0° to 350° C. preferably 20° to 100° C. may be used. It is also possible to vary the pressure between atmospheric pressure and several hundred atmospheres, such as 300 atmospheres.

Olefines may also be polymerized using combinations of the monovalent magnesium compounds with polyvalent compounds of the metals of the 4th to 6th sub-groups of the periodic system as catalysts. The polymers then obtained show a higher molecular weight by comparison with those formed using solely monovalent magnesium compounds. The preferred polyvalent metal compounds are halides or esters, such as titanium tetrachloride, titanium trichloride, zirconium tetrachloride, vanadium tetrachloride, ceriumtrichloride, tungsten hexachloride, tetrapropyl titanate, tetraethyl zirconate. The molar relations of the monovalent magnesium compounds and of the polyvalent metal compounds may vary within wide limits; ranges varying between the molar ratios of 1:10 and 10:1 of the aforementioned types of compounds being preferred.

It has also proved advantageous to add ketones to the polymerization mixtures, since in this way deposition of the polymer on the surface of the catalyst is prevented. These ketones are preferably applied in quantities of 0.1 to 10 percent as calculated on the weight of polymer produced.

Benzophenone, 4,4′-dimethylbenzophenone, 4-methyl-, 4-phenyl-, 4,4′-diphenyl-, 4-methoxy-, 2-methoxy-2,4,6-trimethyl-, 4-n-butoxy-4-isopropyl-, 4,4′ - bis(dimethylamino)-benzophenone, 1-naphthyl-phenyl-ketone, 2,2′-dibenzoyldiphenyl, 1,8-dibenzoylnaphthalene, benzil, p-tolil, anizil, naphthil, mesitil, anthraquinone, fluorenone and others are particularly effective. The result achieved by the aforesaid combination is that the polymerization proceeds at a comparatively high speed and with a good yield, so that high polymers which, as in the case of ethylene, show predominantly crystalline properties are generally formed.

By comparison with the known processes for polymerizing unsaturated compounds with organometallic compounds, the present process has the advantage that the danger of working with inflammable and sometimes spontaneously ignitable compounds, such as the aluminum trialkyls, is obviated and that the catalyst is readily available and easy to handle.

In the following examples, the parts indicated are parts by weight.

PREPARATION OF THE CATALYST 3 parts of magnesium chips are covered with diisopropyl ether; 8 parts of iodine dissolved in diisopropyl ether are then slowly added dropwise thereto. The solution is allowed to boil until it becomes colorless. The mixture of $MgI_2$ and $Mg$ which is formed is freed from ether and heated in vacuo to 200° C.

Example 1

20 parts of the previously described catalyst and 8 parts of ether are introduced into an autoclave from which the air was removed by means of nitrogen. Ethylene is forced in until a pressure of 200 atm. is reached. A fall in pressure occurs at room temperature. More ethylene is forced in for about 2 hours until the pressure remains constant. The reaction product is sucked off, treated with water and 10 percent aqueous hydrochloric acid and thereafter is extracted with benzine. After evaporating the solvent, 5 parts of a semi-solid polymer are left.

Example 2

20 parts of the catalyst previously described are suspended in 90 parts of benzene and 8 parts of ether and introduced into an autoclave from which the air was removed by means of nitrogen. At room temperature, propylene is forced in, this being taken up with a slight rise in temperature. The reaction is terminated after 45 minutes. The catalyst dissolved in benzene is removed, after separating out the undissolved parts from the benzene with aqueous hydrochloric acid. The benzene is dried and distilled off. 8 parts of a highly viscous polymer are left.

Example 3

20 parts of the catalyst previously described are suspended in a mixture of 8 parts of ethylether and 150 parts of benzene in an autoclave from which the air was removed by means of nitrogen. Ethylene is forced in under pressure at room temperature, and is taken up with a slight rise in temperature. The polymer issolved in benzene is stirred with 10 percent dilute aqueous hydrochloric acid and thereafter the benzene is evaporated. 15 parts of a highly viscous oil are left.

Example 4

Distilled chloroprene is diluted with 20 parts of ether and the above catalyst is added at 60° C. with the exclusion of air. After a few hours, the polymer can be precipitated with butanol.

Example 5

In an autoclave from the air is removed by means of nitrogen 20 parts of the above catalyst are suspended in 300 parts of dry benzene with addition of 8 parts of ethylether. With dropwise addition of 3 parts of $TiCl_4$, ethylene is introduced at atmospheric pressure. The temperature rises to 30° C. and the ethylene is taken up until the magnesium chips are coated with a layer of solid polyethylene.

Example 6

In an autoclave from which the air is removed by means of nitrogen, 45 parts of the above catalyst are suspended in 1000 parts of benzophenone, dissolved in 40 parts of benzene, are slowly added dropwise and ethylene is introduced. During the introduction, 6 parts of $TiCl_4$ diluted with 20 parts of benzene are added dropwise. The temperature rises to 35° to 40° C. After 8 hours, the reaction vessel is filled with a thick paste, and the reaction is stopped. The polymer is suction-filtered, washed with benzene and purified by washing with a 5 percent aqueous solution of caustic soda and thereafter with 10 percent aqueous hydrochloric acid. A yield of 70 parts of purified polymer are obtained. Depending on the reaction conditions, the melting point is between 130° C. and 138° C. the density between 0.95 and 0.98 and the molecular weight between 80,000 and 500,000. The crystallinity is higher than 80 percent.

Example 7

In an autoclave from which the air is removed by means of nitrogen, 20 parts of the above catalyst are suspended with 15 parts of ether in 300 parts of benzene. 15 parts of solid benzil are added to this mixture, ethylene is thereafter introduced at normal pressure and 3.3 parts of $TiCl_4$ are added dropwise. With a rise in temperature, ethylene is taken up and polymerized to form polyethylene in a good yield. The solid polymer is separated and purified as described in Example 6.

Example 8

In an autoclave from which the air is removed by means of nitrogen, 20 parts of the catalyst are suspended with 8 parts of ether in 300 parts of dry benzene. 15 parts of fluorenone are added to this mixture, then while introducing ethylene, 3 parts of $TiCl_4$ are added dropwise. The ethylene is polymerized, the solid polymer is separated and purified as described in Example 6.

Example 9

In a autoclave from which the air is removed by means of nitrogen, 12 parts of ether are added to 25 parts of the catalyst and suspended in 300 parts of benzene. 10 parts of benzophenone are added and 2.5 parts of $TiCl_4$ are introduced dropwise. Thereafter, 150 parts of chloroprene are run in. After 6 hours, the reaction mixture has solidified. The polymer is purified with butanol and thereafter by washing with alkali and then acid. The yield of solid polymer is practically 100 percent of the monomer introduced.

Example 10

In an autoclave from which the air is removed by means of nitrogen, 20 parts of the catalyst are suspended with 8 parts of ether in 300 parts of benzene. A solution of 8 parts of benzophenone in 30 parts of benzene is run into this suspension. With dropwise addition of 3 parts of $TiCl_4$ in 20 parts of benzene, butadiene is introduced at normal pressure and room temperature. Butadiene is taken up, and the temperature rises to 40 to 50° C. The polymer is purified in the usual way and it has a rubber-like consistency.

Example 11

In a reaction vessel from which the air is removed by means of nitrogen, 2.5 parts of finely powdered magnesium monobromide is suspended in 250 parts of toluene. The magnesium monobromide was obtained by pyrolysis of phenyl magnesium bromide at 300° C. according to the description disclosed in Berichte 85 (1952), page 593. With dropwise addition of 2.5 parts of $TiCl_4$ which are dissolved in 50 cc of toluene ethylene is introduced at normal pressure and at room temperature. The temperature rises to about 35° C. After about 12 hours, the reaction vessel is filled with a thick paste. The reaction mixture is suction-filtered, washed with benzene and purified by washing with a 5 percent aqueous solution of caustic soda and thereafter with 10 percent aqueous hydrochloric acid. There is obtained a white solid polymer in a yield of 200 g.

The same experiment was repeated with the exception that instead of magnesium monobromide the same amount of magnesium phenyl bromide is applied. Although the reaction mixture containing magnesium phenyl bromide, titanium tetrachloride and ethylene takes a dark color, no polymerization takes place even when the reaction mixture has passed therethrough ethylene for 2 hours.

The magnesium phenyl bromide which has been used for the experiment is obtained as follows:

An ethereal solution of magnesium phenyl bromide was freed from ether by distilling off the ether as far as possible at first at normal pressure, whereafter the product is heated for 2 hours at 90° C. under a pressure of 100 mm. mercury and finally for 5 hours at 90° C. in high vacuum.

Example 12

2.5 parts of magnesium monobromide which are obtained by heating magnesium phenyl bromide for 40 hours in a high vacuum at 250°–300° C. are introduced into an autoclave from which the air was removed by means of nitrogen. Thereafter, ethylene is forced in at a temperature of 350° C. until a pressure of 200 atm. has been reached. After 6 hours, there are obtained 202 parts of a liquid polymer (boiling point $_{760}69°$ to $_{20}165°$ C.) which contains 12 percent of a waxlike polymer.

Example 13

2.5 parts of magnesium monobromide which is obtained by pyrolysis of magnesium phenyl bromide are introduced into an autoclave from which the air was removed by means of nitrogen, and heated to 150° C. Propylene is forced in until a pressure of 252 atm. is reached. After 5 hours, there result 151 parts of a liquid polymer (boiling point: $_{760}52°$ to $_4 164°$ C. and higher). The liquid polymer contains 8 percent of a waxlike polymer.

Example 14

Into a flask which is filled with argon there are introduced 100 parts of dry toluene, 100 parts of dry isoprene and 2.5 parts of magnesium monobromide, the latter being obtained by pyrolysis of phenyl magnesium bromide under reduced pressure. Into this reaction mixture, there are introduced whilst stirring 3.5 parts of titanium tetrachloride or titanium trichloride. The temperature rises to 36° C. The reaction mixture is kept at this temperature until polymerization ceases. Thereafter, the polymer produced is precipitated from the reaction mixture by means of methanol. There are obtained 63 parts of a white product.

In carrying through the process of the present invention, there may also be used halogenated aromatic liquid hydrocarbons as solvents, such as chlorobenzene and bromobenzene. Furthermore, the monovalent magnesium compounds, especially magnesium monobromide, are preferably applied in quantities of 0.1–10 percent by weight, as calculated on the polymer produced.

What we claim is:

1. A process of polymerizing ethylenically unsaturated compounds having at least one terminal $CH_2=C<$ group which comprises contacting said ethylenically unsaturated compounds in an inert substantially anhydrous medium at a temperature of 0 to 350° C. and at a pressure of 1–300 atm. with a catalytic amount of a catalyst prepared from a monovalent magnesium halide and a compound selected from the group consisting of the halides and esters of the metals of the group consisting of cerium, titanium, zironium, vanadium, tungsten, chromium, and molybdenum, the metal of said compound having a valence greater than 2, thereby causing said ethylenically unsaturated compound to polymerize.

2. Process of claim 1 wherein said inert medium additionally contains an aromatic ketone.

3. A process of polymerizing ethylenically unsaturated compounds having at least one terminal $CH_2=C<$ group which comprises contacting said ethylenically unsaturated compounds in an inert substantially anhydrous medium at a temperature of 0 to 350° C. and at a pressure of 1–300 atm. with a catalytic amount of a monovalent magnesium halide, thereby causing said ethylenically unsaturated compound to polymerize.

4. A process according to claim 3, wherein said inert medium is an inert liquid organic solvent.

5. A composition of matter suitable for use as a catalyst for the polymerization of ethylenically unsaturated compounds having at least one terminal $CH_2=C<$ group comprising the reaction product of a monovalent magnesium halide and a compound selected from the group consisting of the halides and esters of the metals of the group consisting of cerium, titanium, zirconium, vanadium, tungsten, chromium, and molybdenum, the metal of said compound having a valence greater than 2.

6. A composition of matter according to claim 5 which is suspended in an inert substantially anhydrous medium containing an aromatic ketone.

7. The composition of claim 5 wherein said monovalent magnesuim halide is magnesium monobromide.

8. The composition of claim 6 wherein said monovalent magnesium halide is magnesium monobromide.

9. A process of polymerizing ethylenically unsaturated monomers selected from the group consisting of monoolefins, monoolefinically unsaturated cycloaliphatic hydrocarbons, monovinyl aromatic compounds, divinyl aromatic compounds, halogenated monoolefins, conjugated diolefins, and acrylonitrile, which comprises contacting said monomers in an inert essentially anhydrous medium at a temperature of 0–350° C. and at a pressure of 1–300 atm. with a catalytic amount of a monovalent magnesium halide, thereby causing said monomers to polymerize.

10. A process according to claim 3, wherein said monovalent magnesium halide is magnesium monobromide.

11. A process according to claim 1, wherein said monovalent magnesium halide is magnesium monobromide.

12. A process according to claim 3, wherein said monovalent magnesium halide is obtained by pyrolysis of an organic magnesium compound in which the magnesium has a valence of 2.

13. A process according to claim 12, wherein the monovalent magnesium halide is obtained by pyrolysis of an aryl magnesium halide.

14. A process according to claim 1, wherein said monovalent magnesium halide is obtained by pyrolysis of an organic magnesium compound in which the magnesium has a valence of 2.

15. A process according to claim 1, wherein the monovalent magnesium halide is obtained by pyrolysis of an aryl magnesium halide.

16. A process of polymerizing ethylenically unsaturated compounds having at least one terminal $CH_2=C<$ group which comprises contacting said ethylenically unsaturated compounds in an inert substantilly anhydrous medium at a temperature of 0 to 350° C. and at a pressure of 1 to 300 atmospheres with a catalytic amount of a monovalent magnesium halide, thereby causing said ethylenically unsaturated compound to polymerize, said monovalent magnesium halide being employed in quantities of 0.1 to 10% by weight based on the weight of polymer produced.

17. Process of claim 11 wherein said monovalent magnesium halide is employed in combination with titanium tetrachloride, the molar ratios of the two compounds to each other being in the range of 1:10 to 10:1.

18. Process of claim 17 wherein a ketone is employed in the polymerization mixture in an amount of 0.1 to 10% based on the weight of polymer produced.

References Cited in the file of this patent

UNITED STATES PATENTS 2,721,189   Anderson et al. _____ Oct. 18, 1955

FOREIGN PATENTS 776,326   Great Britain _____ June 5, 1957
777,538   Great Britain _____ June 26, 1957
779,111   Great Britain _____ July 17, 1957
1,138,290   France _____ June 12, 1957

OTHER REFERENCES

Pauling: "General Chemistry," page 61, W. H. Freeman and Company, San Francisco, Calif. (1947).

Wiberg et al.: Berichte, 85, pages 593–605 (1952).

Partington: "Textbook of Inorganic Chemistry," Macmillan & Co., London (1953), page 368.

Handbook of Chem. and Phys., 38th Ed. (1956), pages 394–395.